(12) United States Patent
Zeller

(10) Patent No.: US 6,700,714 B2
(45) Date of Patent: Mar. 2, 2004

(54) DEVICE FOR BEAM GUIDING A LASER BEAM

(75) Inventor: Thomas Zeller, Sindelfingen (DE)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 10/280,583

(22) Filed: Oct. 23, 2002

(65) Prior Publication Data

US 2003/0123160 A1 Jul. 3, 2003

(30) Foreign Application Priority Data

Oct. 23, 2001 (DE) .......................................... 101 51 587

(51) Int. Cl.[7] ................................................ G02B 7/02
(52) U.S. Cl. ........................ 359/818; 811/819; 811/822
(58) Field of Search ................................ 359/818, 811, 359/819, 799, 822

(56) References Cited

U.S. PATENT DOCUMENTS

| 3,712,196 A | * | 1/1973 | Lange ........................ 396/268 |
| 5,249,082 A | * | 9/1993 | Newman ..................... 359/813 |
| 5,424,872 A | * | 6/1995 | Lecuyer et al. .............. 359/811 |
| 5,602,864 A | * | 2/1997 | Welch et al. ................. 372/50 |
| 6,563,113 B1 | * | 5/2003 | Amann et al. ............... 250/309 |

* cited by examiner

Primary Examiner—Ricky Mack
Assistant Examiner—Brandi N Thomas

(57) ABSTRACT

A device for beam guiding a laser beam with at least one optical element, which is positioned with a retaining element to a supporting section, and with a clamping element, which fixes the optical element to the supporting section of a housing section, wherein the housing section having the supporting section has a fastening section on which the clamping element engages for the central introduction of a retaining force and positions the optical element to the supporting section with the interposition of at least one retaining element.

18 Claims, 5 Drawing Sheets

DEVICE FOR BEAM GUIDING A LASER BEAM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a device for beam guiding a laser beam, with at least one optical element, which with a retaining is positioned with respect to a supporting section of a housing.

TECHNICAL FIELD

Laser technology is used in very varied fields. For example, $CO_2$ lasers, e.g. square-folded or coaxial $CO_2$ lasers, are used for flexible material processing.

Square-folded resonators have been developed for increasing the power; in them, based on the folding of the light path, a long discharge path is provided in spite of a compact structure. Optical elements for beam guiding are provided at the end of the discharge path, and are positioned on housing sections.

In coaxial $CO_2$ lasers, unstable resonators are concerned, with an annular discharge space which has, for example, toroidal optical elements for beam guiding.

The optical elements used for beam guiding are differently constituted in transmittance and reflectance, in dependence on their function. Optical elements are used which make total reflection possible, and also optical elements which make possible a partial transmission with different transmittances.

In square-folded $CO_2$ lasers, a device for receiving the optical element has heretofore been used, which has a first annular member for mounting the optical element, arranged on the vacuum side of the laser path. The optical element is positioned relative to the annular member by means of an intermediate member which surrounds the optical element in the radial direction. A retaining member is set on the intermediate member and connected to it, and fixes the optical element axially of the first annular member. The intermediate member is first fixed to the annular member by screw connections. The retaining member is then likewise fixed to the annular member by tightening screws which pass through the intermediate member. This arrangement is very time-consuming in the assembly of the optical element and requires high precision in the production of the components. A non-uniform application of force to the optical element can result from the fixing of the retaining member to the ring member by means of tightening screws, due to a different tightening torque of the tightening screws, so that distortions arise in the optical element. At the same time, the distortions of the screw securement lead to unevenness of the seating surface of the optical element, resulting in a smaller heat conduction from the optical element into the ring member. A deformation of the optical element follows from the unevenness of the seating surface. Heat can be transferred out of the optical element more poorly because of the smaller contact surface as against an ideally flat seating surface, and the beam quality is worsened.

In coaxial $CO_2$ lasers with their unstable laser resonators, the laser radiation is coupled out by means of a gap in an annular mirror. The laser beam leaves the vacuum chamber through a transmissive optical element which forms the closure of the vacuum chamber. If the sealing of the optical element takes place e.g. by soldering, the soldered joint is exposed to a temperature change stress when the laser is operating. This has the consequence that the joint can become leaky in the course of time.

SUMMARY OF THE INVENTION

The invention now has as its object to provide a device for beam guiding a laser beam with at least one optical element which has a planar seating surface for complete seating of the optical element and also makes possible a simple and rapid, and also stress-free, assembly of the optical element.

This object is attained by a retaining element, a support section of a housing section, at least one optical element which with the retaining element is positioned with respect to the supporting section, a clamping element that fixes the optical element to the supporting section of the housing section, a fastening section on the housing section having the supporting section, on which the clamping element engages for central force introduction of a retaining force and at least one retaining element interpositioned between the clamping element and the optical element that positions the optical element with respect to the supporting section.

A distortion-free arrangement of the optical element to the supporting section is given by means of a central introduction of a retaining force on the optical element with a clamping element via a retaining element, for seating on a supporting section of a housing section. Furthermore it is thereby made possible to use any optional geometry of an optical element. A specific matching of the device to different beam profiles can thereby be made possible. This matching of the optical element to the beam profile has the advantage that a rapid removal of the heat arising in the optical element due to the absorbed laser radiation is made possible. Deformations of the optical element can thereby be kept small or even prevented.

Furthermore, due to the central introduction of force, the optical element can abut completely on the supporting section, and the flatness of the seating surface can be maintained, so that good heat removal is provided. It is furthermore made possible by the central introduction of the retaining force with a clamping element that s simple assembly of the optical element to the housing section is given. The at least one optical element of the at least one retaining element and the clamping element can be mounted, simply and securely, one after another to the housing section. Since the clamping element has the effect of a central closure, a considerable saving of assembly time can moreover be attained. Furthermore, a reduction of the number of components is provided by the arrangement of a fastening element on the housing section for the clamping element, so that a reduction in production costs is attained.

According to an embodiment of the invention, it is provided that the clamping element is constituted as a screw ring. A clamping element that is easy to manipulate in assembly is thereby provided. The use of the screw ring as the clamping element makes possible a uniformly distributed introduction of force on a retaining element, so that the optical element abuts with a uniform pressing force on the supporting section of the housing section.

According to a further embodiment of the invention, it is provided that a clamping surface is provided between the retaining element and the clamping element, and has at least one sectionally annular surface. This embodiment makes possible a reduced frictional moment between the clamping element and the retaining ring, so that a transmission of the axial force without at least partial rotation of the retaining element is made possible, whereby the optical element is pressed against the supporting section without any change of its previously fixed position.

According to a further embodiment of the invention, it is provided that the retaining element has a stop surface as a mounting safeguard. Thereby, when a maximum torque for the tightening of the clamping element is exceeded, a safe mounting of the optical element can be provided. Since the retaining element abuts on the optical element via a seal or a sealing damping element, a distortion-free positioning of the optical element on the supporting section is provided. Alternatively, it can also be provided that the stop surface is arranged on a housing section or further component.

According to a further embodiment of the invention, it is provided that the supporting section of the housing is produced by turning or milling with diamond, polycrystalline diamond (PKD), ceramics, and also by grinding, precision turning, or lapping. Due to the low roughness thereby attained, the supporting section has a higher contact surface between the optical element and the supporting section, leading to an improved heat removal. Furthermore, a high degree of flatness, for example less than 10 $\mu$m, preferably less than 1 $\mu$m, can be attained by this treatment, so that the lost power, which is reflected in a heating of the optical element, is reduced.

Furthermore, it is provided that a seal or a sealing damping element is arranged between the retaining element and the optical element, so that a sealed arrangement is provided between the optical element and a housing section surrounding the optical element, or a section of the retaining ring, surrounding the optical element. Simultaneously, a sufficient pressure of the optical element on the supporting section can be maintained due to the resilient effect of the seal, in order to ensure a good removal of heat.

A further embodiment of the invention provides that the optical element is constituted of diamond, zinc selenide, gallium arsenide, silicon or copper. The material for the optical element can be chosen according to the purpose for which the device is to be used, the laser type, and the laser power. For example, silicon is used in a square-folded $CO_2$ laser as the deflecting mirror up to 4 kW, and copper for a higher power range. Zinc selenide is preferred as the coupling-out mirror in a square-folded $CO_2$ laser. In coaxial $CO_2$ lasers, zinc selenide can be used at low powers, or diamond at all power ranges, as the material for the optical element.

In the design of an optical element departing from a round diameter in the outer contour, it is provided that the optical element is fixed by a frame in a position coincident with the exit opening in the housing section. By this means, the optical element can completely cover the exit opening and the region of the optical element abutting on the seating surface is preferably equal in amount in all directions. A uniform heat removal can thereby be provided.

According to a further embodiment of the invention, it is provided that a seal is respectively provided between the housing section and the frame, and also between the optical element and the frame. A vacuum-tight arrangement can thereby be provided in a simple manner. A simplification in assembly can be provided by the separated design. In addition, an increase of the degree of sealing can be made possible.

According to a further embodiment of the invention, it is provided that the optical element has an outer contour matched to the beam profile and preferably rectangular, banana-shaped, or the like and in particular made of diamond. This form of embodiment is particularly advantageous when used for coupling a laser beam out of a coaxial $CO_2$ laser. By matching the geometry of the optical element to the coupled-out beam profile, the production costs of the optical element can be reduced, particularly when diamond is used. At the same time, the heat arising from the absorbed laser radiation can be directly carried away via the seating surface into the housing section. Furthermore, good airtightness can be attained by the application of a central retaining force over the clamping element, and the separation of the force transmission to a retaining element, even with non-circular geometry of the optical element.

Industrial diamonds are preferably used. Due to the high thermal conductivity of diamond, the heat that arises in the optical element from the absorbed laser radiation can be carried away very rapidly into the cooled housing. Furthermore, a low thermal expansion and a high mechanical strength are given. The optical element can thereby substantially retain its initial shape. Diamond furthermore has a long lifetime, even under high power. With unstable resonators, as is the case with coaxial $CO_2$ lasers, the laser beam after leaving the vacuum chamber is shaped by mirrors and by a diaphragm. The focus of the laser beam must here be situated in the diaphragm. Excessive heating of the optical element and a resulting deformation would give a deflection of the exiting laser beam or a focus displacement in the beam direction. This could lead to damaging the diaphragm in the beam telescope and can be prevented by the advantageous embodiment.

According to a further embodiment of the invention, it is provided that the retaining element has an inclined surface surrounding and abutting the seal, and fixing the seal at least in the direction of the optical element, which preferably has a round outer contour, and/or at least radially outward. It is thereby made possible that a sealing effect toward the vacuum side of the housing section is attained.

It is provided, for round optical elements, that the seal is constituted as an O-ring seal which has an external diameter equal to or greater than that of the housing section, or section of the retaining element, immediately surrounding the optical element. The optical element can thereby be retained by means of the seal in a preassembled position after insertion. Furthermore, it is thus made possible that the retaining element and the seal do not rotate during the application of the retaining force and that the retaining element only executes a motion in the axial direction, directed toward the optical element. By means of the seal abutting directly on the housing section, a frictional moment is given toward the housing section and on the inclined surface, after the insertion of the retaining element, and is greater than the frictional moment between the retaining element and the clamping element. The rotational motion of the clamping element can thereby be converted into an axial motion of the retaining element.

BRIEF DESCRIPTION OF THE DRAWINGS

Preferred embodiment examples of the invention are described in detail using the accompanying drawings and the specification.

DETAILED DESCRIPTION OF THE INVENTION

Figure 1:
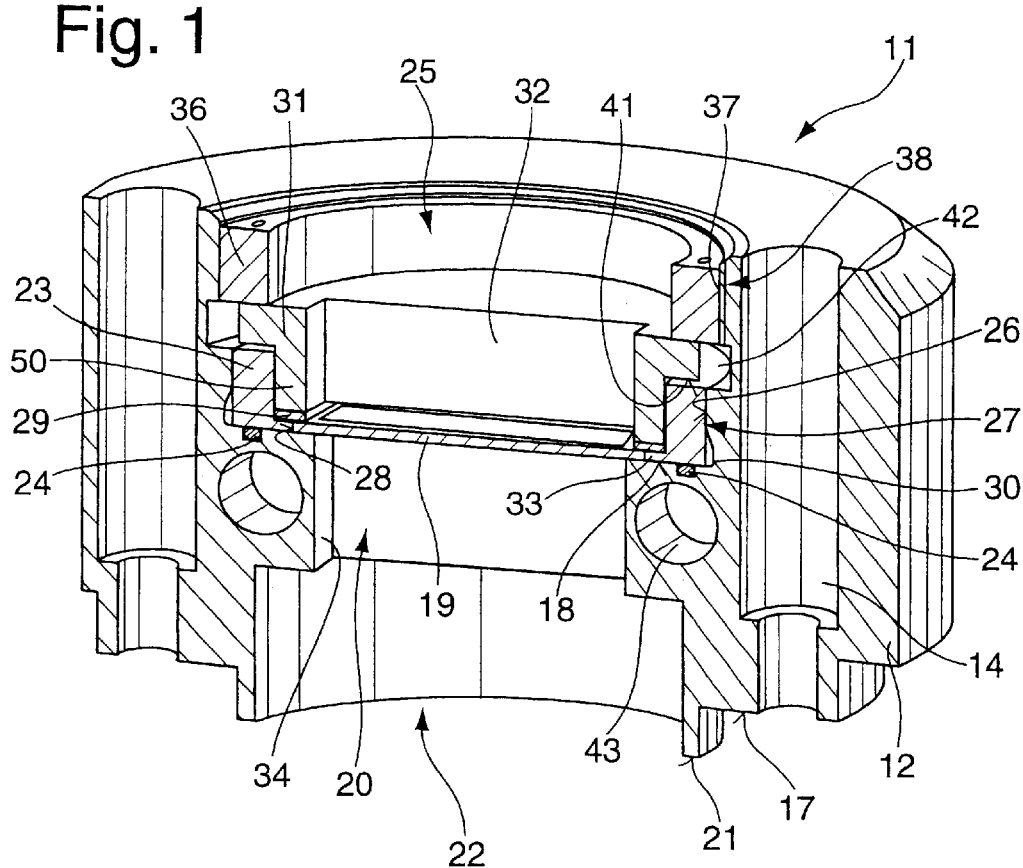
FIG. 1 shows a schematic diagram, in cross section, of a device according to the invention.
Figure 2:
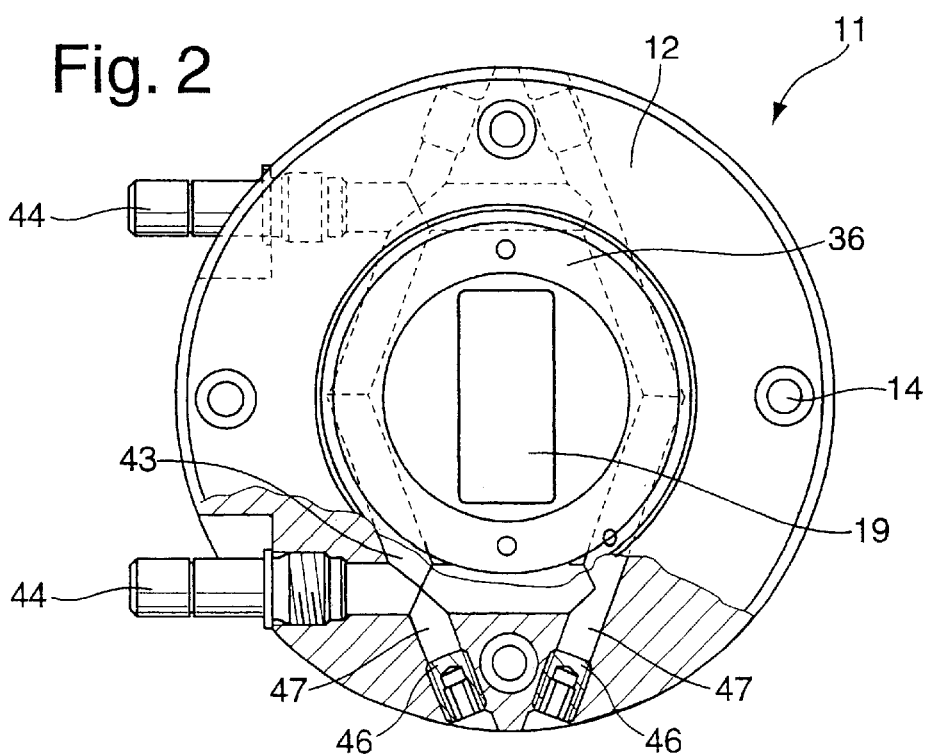
FIG. 2 shows a schematic top view of the device according to FIG. 1.
Figure 3:
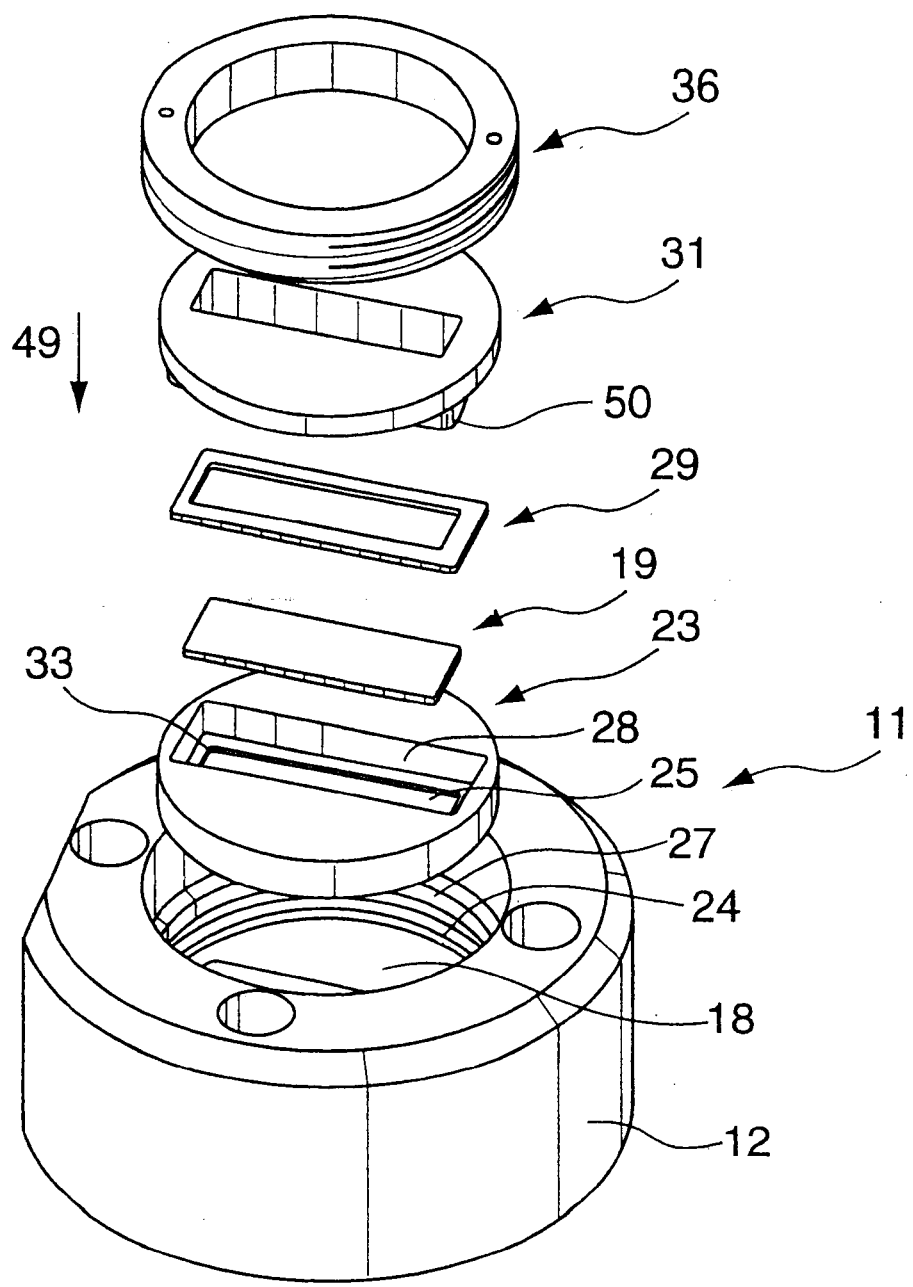
FIG. 3 shows an exploded diagram of the device according to FIG. 1, in which the sequence of installing the components is shown.

A first embodiment of a device 11 according to the invention for beam guiding of a laser beam is shown n FIGS. 1–3. This device 11 is provided, for example, for the coupling-out of a laser beam in coaxial $CO_2$ lasers, which have a typical power range of, for example, 500 W up to 2,000 W.

The device 11 according to FIG. 1 has a housing section 12. Stepped through-bores 14 are provided in the outer region of the housing section 12 in order for example to fix the housing section 12 to the resonator by means of screws. For example, the housing section 12 can be arranged on a closure cover of a resonator of a coaxial $CO_2$ laser. Alternatively, it can also be provided that the housing section 12 is integrated into a closure cover of a coaxial $CO_2$ laser.

For mounting the device 11 on a resonator, a flange mounting surface 17 is provided which is constituted parallel with high precision to a supporting section 18 for an optical element 19. A surrounding collar 21 is provided for additional guiding of the housing section 12 on a resonator or housing portion of a resonator.

This collar 21, or the flange mounting surface 17, surrounds a stepped bore 22, which, bordering on the supporting section 18, has a cross section preferably matched to the beam profile. The exit opening 20 bordering thereon can be of a round, rectangular, or banana shape. Any further geometry that is required for matching the beam profile for beam guiding a laser beam can likewise be introduced.

The optical element 19 is situated with its narrow edge region on the supporting surface 18. A frame 23 surrounds the optical element 19, preferably completely, and has a clearance fit to the optical element 19. Heat arises in the optical element 19 due to the absorbed laser radiation during beam guiding of the laser beam. Expansions that may arise due to the heating make possible a distortion-free positioning by means of the clearance fit.

A seal 24 is provided between the frame 23 and the supporting section 18, in order to close the exit opening of the stepped bore 22 vacuum-tightly. The frame 23 has an outer circumferential surface 26 by means of which the frame 23 is guided in a bore section 27 of the housing section 12. For complete seating on the supporting section 18, an undercut 30 is provided in the bore section 27, bordering on the supporting section 18. The frame 23, which also has the function of an intermediate member or adapter for matching to different body shapes of the optical element 19, is constituted in the shape of a disk and has a recess 28 which is larger than an opening 25 for the optical element 19. The recess 28 is constituted such that a step-shaped seating surface 33 is constituted around the opening 25 of the frame 23 on which a further seal 29 is seated after the introduction of the optical element 19. This seal 29 covers the gap between the optical element 19 and the step-shaped seating surface 33 of the frame 23, in order to make sealing possible in the beam direction.

A retaining element 31 fixes the seal 29 to the optical element 19 and to the step-shaped seating surface 33 of the frame 23. Here it is preferably provided that an inner surface 32 of the retaining element 31 is flush with, or recessed with respect to, a circumferential surface 34 of the exit opening 20 of the stepped bore 22. The size of the seal 29 is similarly constituted. In this manner it is attained that the free region formed by the circumferential surface 34 for beam guiding of the laser beam is not diminished by the seal 29 and by the retaining element 31 positioned on the beam exit side.

The retaining element 31 is fixed by means of a clamping element 36. The clamping element 36 is advantageously constituted as a tightening ring and engages with an external thread 37 on a fastening section 38 of the housing section 12. A central introduction of force to the retaining element 31 is thereby made possible. The external thread 37 can also be constituted as a fine thread, so that a tightening moment of the clamping element 36 can preferably be set very sensitively, preferably by means of a torque wrench. Other clamping elements alternative to this clamping element 36 can be introduced which fulfill the function that a finely-gauged setting of the retaining force on the retaining element 31 is made possible in order to fix the optical element 19 to the supporting section 18, free from distortion and tilting.

It is advantageously provided that the friction surfaces between the retaining element 31 and the clamping element 36 are as small as possible in diameter, so that the frictional moment arising on tightening the clamping element 36 is small. In order to make possible an exact alignment of the optical element 19 to the exit opening 20 and to prevent a rotation, it can additionally be provided that a positioning force between the housing section 12 and the frame 23 is provided for positionally correct fixing of the frame 23. The retaining element 31 can preferably have as a mounting safeguard, a stop surface 41 that comes to abut on an end surface 42 of the frame 23 when the tightening moment is excessive. Crushing of the seal 29 and possible damage to the optical element 19 are thereby absent. It can alternatively be provided that the stop surface 41 is provided projecting on the end surface 42 of the frame 23.

The housing section 12 is preferably constituted of a material with high thermal conductivity. For example, aluminum alloys or the like are used. These furthermore have the advantage that both cost-favorable and also precise machining is provided. The supporting section 18 is produced with high precision by turning or milling with diamond, polycrystalline diamond (PKD), ceramics and also be grinding, precision turning, or lapping. At the same time, this supporting section 18 has a high degree of flatness, in order to make possible full-surface seating of the edge section of the optical element 19. A good heat removal can thereby be attained. In addition, a cooling channel 43 is provided close to the supporting section 18 and preferably completely surrounds the exit opening 20 near to the supporting section 18.

The arrangement of such a cooling channel 43 is shown, for example, in FIG. 2 in a top view of the housing section 12. The cooling channel 43 surrounding the optical element 19 has connection stubs 44 for the supply and discharge of a cooling liquid medium. The cooling channel 43 is for example produced by bores, which are introduced into the housing section 12 in a manner such that these open into one another. The bore sections 47 which are required for producing the cooling channel sections are closed and sealed to medium, so that a surrounding cooling channel 43 is constituted.

The optical element 19 is advantageously constituted of diamond when this device is used in a coaxial $CO_2$ laser. This material has the advantage of a high thermal conductivity. Moreover, diamond has a small thermal expansion coefficient, so that the thermal expansion is small. A coating with a surface only slightly smaller than the exit opening 20 of the stepped bore 22 is constituted on the optical element 19. The edge region of the optical element 19, which is situated on the supporting section 18, is thereby free from the coating, so that a high removal of heat is made possible. By the matching of the geometry of the optical element 19 to the beam profile it is made possible that the costs for the production of an optical element 19 of diamond is reduced. Furthermore, the optical element 19 constituted of diamond have the advantage that the geometry is maintained when the laser radiation is absorbed and heating occurs in the optical element. A change in shape of a thermal lens or the like is not given. Exit of the laser beam free from deflection is thereby given.

FIG. 3 shows an exploded diagram of the device according to the invention according to FIGS. 1 and 2. By the insertion of the parts in the direction of the arrow 49 in the sequence shown, rapid and secure assembly of an optical element 19 in the housing section 12 can take place. It can also be seen that a given alignment of the parts and positioning in the correct position results, solely based on the geometry. It is also clear from this diagram that the housing section 12 can also be a portion of a closure element or cover of a resonator. The individual components, such as the optical element 19, the frame 23, the seals 24 and 29, the retaining element 31 and also the clamping element 36 can be inserted independently of the further coupling-on of the housing section 12.

Based on the installation sequence, according to which the frame 23 is first inserted in the bore section 27, the optical element 19 can be positioned in its final position with respect to the supporting section 18 of the housing section 12. The subsequent placing of the seal 29, the setup of the retaining element 31 and the mounting of the clamping element 36 make possible a fixation of the optical element 19 without rotation or tilting, so that a complete seating of the edge region of the optical element 19 on the supporting section 18 is given without damaging these surfaces.

Figure 4:
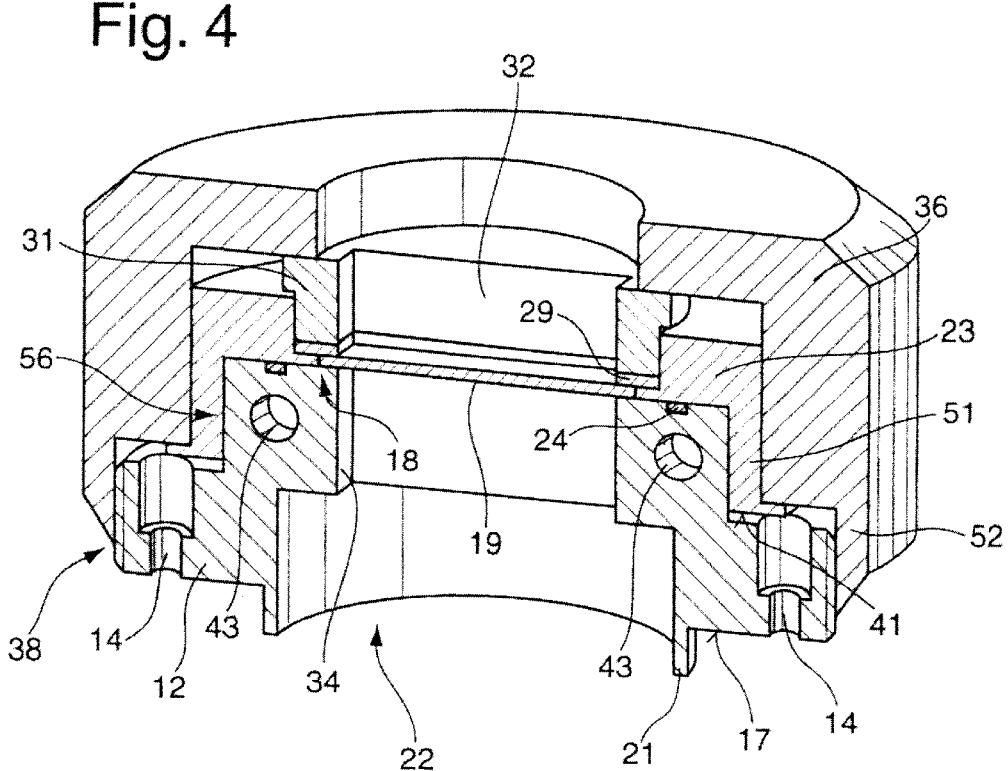
FIG. 4 shows a schematic diagram, in cross section, of an alternative device to that of FIG. 1.

FIG. 4 shows an alternative embodiment to FIG. 1. The principle of the construction and the assembly sequence as shown in FIG. 3 are maintained. Differing from the embodiment in FIGS. 1–3, it is provided in the embodiment according to FIG. 4 that the frame 23 engages around an outer circumference 56 of the housing section 12 with a surrounding shoulder 51. By analogy, the clamping element 36 engages around the shoulder 51 of the frame 23, in order to engage by means of a screw connection on the fastening section 38 of the housing section 12. A stop surface 41 is provided on a salient end 52 of the shoulder 51 and again serves as a mounting safeguard for the clamping element 36. This embodiment shown in FIG. 4 shows, in contrast to the embodiment shown in FIGS. 1–3, that instead of installation of the components into a housing section 12, a fixation of the components is made possible by an at least partial engagement around the housing section 12. For the rest, the statements regarding FIGS. 1–3 hold.

Further alternative embodiments, for example for an optical element 119 of round cross section, are shown in FIGS. 5–8. Based on the round cross section, the frame 23 according to the embodiments in FIGS. 1 and 4 can be omitted, whereby the assembly of the optical element 119 is additionally facilitated.

Depending on the reflectance and transmittance of the optical element 119, the embodiments according to FIGS. 5–8 can for example be used in $CO_2$ lasers as coupling-out mirror, deflecting mirror, reflecting mirror or partially transmitting mirror for monitoring the power of the laser beam.

Depending on the purpose of use, for example, the materials silicon, zinc selenide, gallium arsenide, diamond or copper can be used, with and without coatings.

Figure 5:
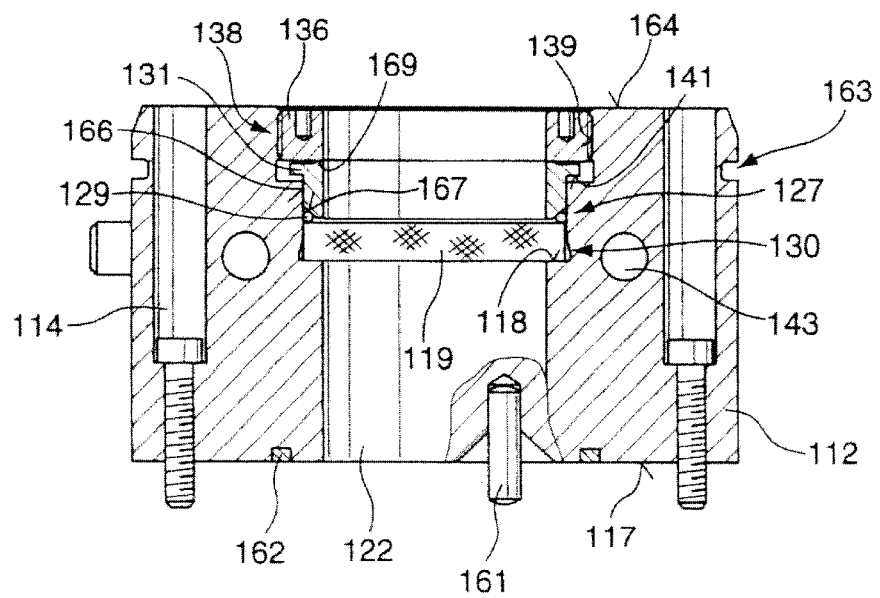
FIG. 5 shows a schematic diagram, in cross section, of a further alternative device to that of FIG. 1.

The housing section 112 in FIG. 5 has stepped throughbores 114 in order to fasten the housing section 112 with screws to, for example, a resonator. For this purpose, a flange mounting surface 117 is provided, in which a centering pin 161 is inserted for positioning in correct position. A seal 162 is likewise provided in this flange mounting surface 117 in order to provide, vacuum-tightly to the resonator, a first section of the housing section 112 reaching to the optical element 119.

The housing section 112 has at the external circumference a surrounding groove 163 into which a sleeve or sheath can engage in order to form, for example, a beam telescope coupled onto an end surface 164 of the housing section 112.

The optical element 119 is provided on a supporting section 118 of the housing section 112. The supporting section 118 has a flatness of less than 10 μm, for example 1 μm. Furthermore a small surface roughness is given by the fine processing as described for FIG. 1, so that an increased heat removal is attained. Furthermore, an exact alignment of the optical element 119 can be given, and the deformation reduced, by the high degree of flatness.

The external diameter of the optical element 119 with respect to the diameter of a bore section 127 is designed so that a clearance fit is provided. This clearance fir is in particular constituted as an easily running fit. The optical element 119 is thereby received without stress, even when it becomes heated. A surrounding depression 130 or undercut is provided in the transition region between the supporting section 118 and the bore section 127. This makes possible a complete and planar seating of the optical element 119 on the supporting section 118

The retaining element 131 is inserted into the bore section 127, and can be received radially by a guide surface 166 in the bore section 127. An inclined surface 167, inclined inward and engaging on a seal 129, adjoins this guide surface 166 in the direction toward the optical element 119. This inclined surface 167 serves to press the seal 129 simultaneously against the housing section 112 and the optical element 119. The pressing force, or respectively the prestress, can be distributed to the housing section 112, or respectively the optical element 119, by means of the angle of the inclined surface 167. The seal 129 is constituted as an O-ring seal in this embodiment example. The external diameter of the seal 129 is constituted equal to, or preferably slightly greater than, the diameter of the bore section 127. It is thereby ensured that, from the beginning onward, a frictional moment exists between the housing section 112, the seal 129, and the retaining element 131.

A clamping element 136 is provided in a further fastening section 138 of the housing section 112, and exerts a central retaining force on the optical element 119 via the retaining element 131. The clamping element 136 is constituted as a screw ring, and preferably has a fine thread. The thickness of the screw ring is determined by a minimum number of thread turns in order to apply the retaining force. A clamping surface 159 is provided between the clamping element 136 and the retaining element 131. This clamping surface 169 is constituted as a narrow, surrounding annular surface, preferably on the retaining element 131. Alternatively, this clamping surface 169 can also be provided on the clamping element 136. The average diameter of the clamping surface 169 is made as small as possible, so that the frictional moment arising between the retaining element 131 and the clamping element 136 on tightening the clamping element 136 is smaller than the frictional moment between the retaining element 131 and the seal 129, or the seal 129 and the housing section 112.

A stop surface 141 is constituted in the transition region between the bore section 127 and the fastening section 138, and serves as a mounting safeguard. The distance between a free end, facing toward the optical element 119, of the inclined surface 167 of the retaining element 131 and the stop surface 141 is set such that abutment of the free end of the inclined surface 167 on the optical element 119 does not occur, even with an excessive tightening moment of the clamping element. 136.

The internal diameter of the retaining element 131 and of the clamping element 136 are constituted the same or greater in diameter than a section bordering on the supporting section 118 in the housing section 112.

Analogously to FIG. 3, the optical element 119, the seal 120, the retaining element 131 and the clamping element 136 are inserted. By means of the seal 129, constituted slightly greater in diameter than the bore section 127, it is made possible that the optical element 119 is pre-fixed to the supporting section 18 after insertion of the seal 129. At the same time, the frictional force acting between the bore section 127 and the seal 129, and also the retaining element 131, is greater than the frictional force acting on the retaining element 131 due to the clamping element 136 during the clamping process. The rotary motion of the clamping element 136 can thereby be transferred into an axial motion, and the optical element 119 can be positioned, free from stress and tilting, with respect to the supporting section 118.

The arrangement shown in FIG. 5 for positioning the optical element 119 furthermore has the advantage that the separate arrangement of sealing functions and heat removal functions is given. Thereby thermal changes of the optical element 119 due to absorbed laser radiation can be kept small.

Alternatively to the seal 129 as an O-ring, a spring element designed in another way can be used., for example, a coil spring, a compression spring, or the like, in order to attain a uniform and secure abutment of the optical element 119 on the supporting section 118.

The cooling of the optical element 119 takes place analogously to the cooling shown in FIG. 2. The cooling channel 143 is arranged as close as possible to the seating surface 118. Such cooling is of advantage particularly with high laser powers and the mostly large mirror diameters associated with them. The cooling can be provided alternatively with smaller mirror diameters.

Figure 6:
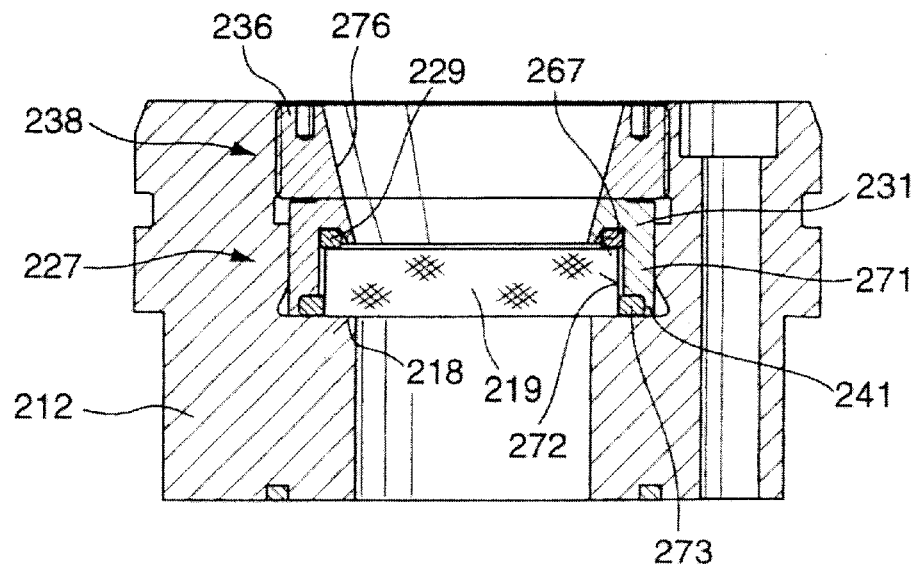
FIG. 6 shows a schematic diagram, in cross section, of a further alternative device to that of FIG. 5.

An alternative embodiment to FIG. 5 is shown in FIG. 6. The differences are explained in detail hereinbelow. Reference is made to the foregoing FIGURES as regards the identical embodiments.

In this embodiment, the retaining element 231 has a ring section 271 which completely surrounds a radial circumferential surface 272 of the optical element 119 and abuts on the bore section 227 and is guided therein. A fit is provided between the circumferential surface 272 of the optical element 219 and the ring section 271 of the retaining element 231, similarly to that described between the bore section 127 and the optical element 119 in FIG. 5. The retaining ring 231 has a stop surface 241 formed by the end surface of the ring section 271. As mounting safeguard, it is provided that the distance between a free end of the inclined surface 267 and the stop surface 241 is at least slightly greater than the thickness of the optical element 219 and the coating possibly applied to this. A further seal 273 is provided in addition on the end surface of the ring section 271 in order to seal the core section 227. This seal 273 can also be provided in the bore section 227. The retaining element 231 and the clamping element 236 have, seen in cross section, a wedge-shaped structure of an exit channel 276 which is formed alternatively to the cylindrical exit channel in FIG. 5. Likewise, a stepped arrangement, or a mixed shape from these, can also be provided.

Figure 7:
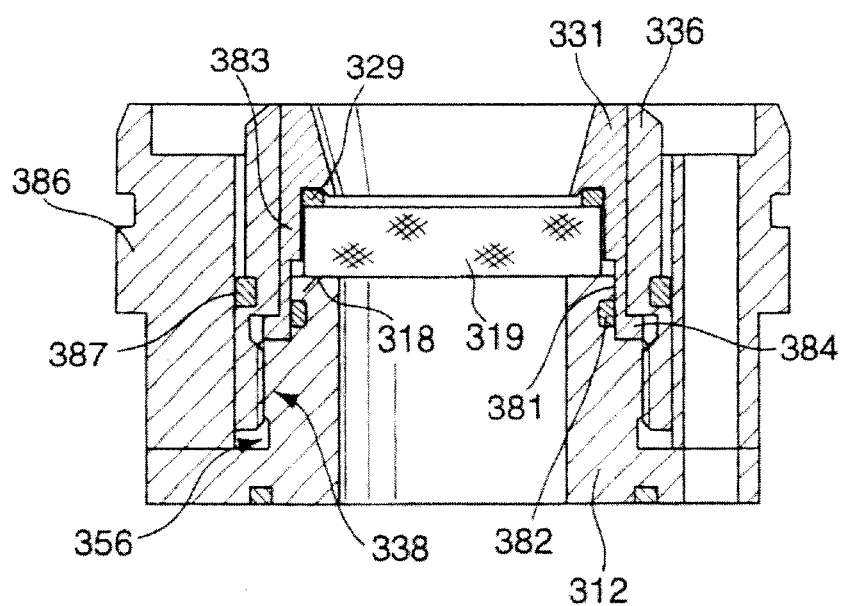
FIG. 7 shows a schematic diagram, in cross section, of a further alternative device to that of FIG. 5.

A further alternative embodiment is shown in FIG. 7. This alternative embodiment corresponds to the structure in principle according to the embodiment in FIG. 4, and is adapted according to FIG. 7 to a round optical element 319. The retaining element 331 has a guide surface 381 that abuts on an outer circumference 356 of the housing 312. A seal 382 is provided between the outer circumference 356 of the housing 312 and the guide surface 381. The optical element 319 is guided with a section 383. A mounting safeguard is provided analogously to FIG. 5 and is constituted by the outward-directed annular collar 384. Alternatively, a step in a region of the retaining element 331 surrounding the optical element 319 can be provided, coming into abutment with the seating surface 318.

The clamping element 336 engages on a fastening section 338 of the housing section 312, which is constituted as an external thread on the housing section. The retaining element 331 is moved toward the optical element 319 by the clamping element 336 by means of the annular collar 384, in order to fix the optical element 319 to the seating surface 318 by means of the seal 329. The housing section 312 furthermore has a housing member 386 which completes the housing circumference or respectively the external shape to give a housing section which corresponds to the housing section 112 and 212, in order to provide, independently of the embodiment of the retaining element 331 and clamping element 336, an embodiment which is constructionally the same in external dimensions and function as, for example, FIGS. 5 and 6, An additional seal 337 is provided between the clamping element 336 and the further housing member 386, and prevents so-called fresh air being conducted into the beam path when this embodiment is used as a coupling-out mirror. At the same time, a centering of the additional housing member 386 can be provided by the introduction of this seal 387.

Figure 8:
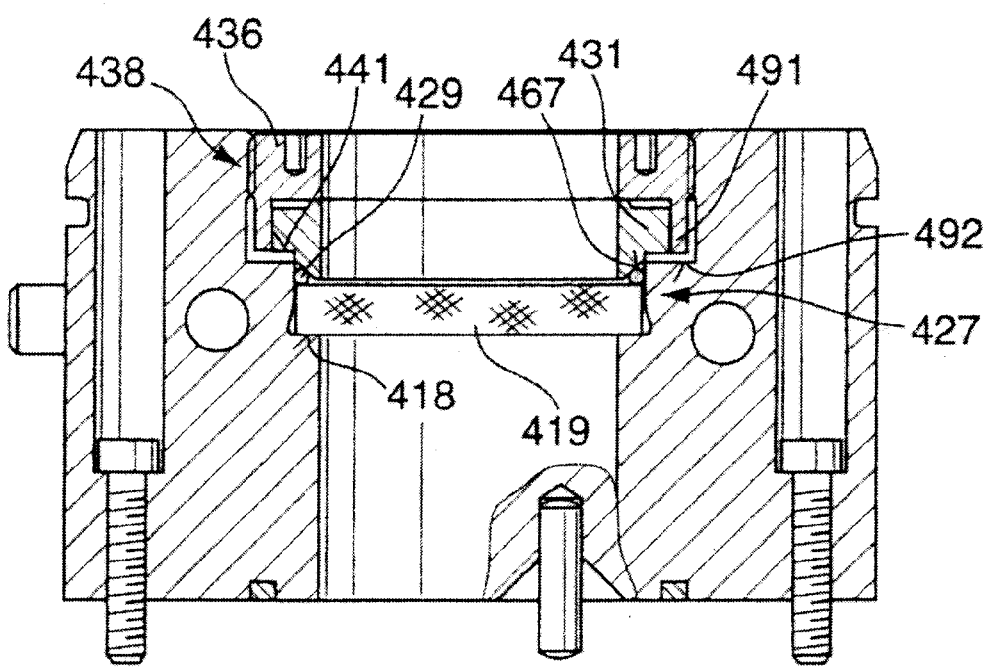
FIG. 8 shows a schematic diagram, in cross section, of a further alternative device to that of FIG. 5.

A further alternative embodiment to FIGS. 5, 6 and 7 is shown in FIG. 8. The clamping element 436 is provided in the fastening section 438 and in addition has a sleeve 491, which at least partially surrounds and guides the retaining element 431. The mounting safeguard is provided by a stop surface 441 to the effect that the distance between the free end of the inclined surface 467 and the supporting section 418 is matched to the thickness of the optical element 419 and the height of the bore section 427. Alternatively, the mounting safeguard can be constituted to the effect that the length of the sleeve 491 to the clamping surface of the retaining element 431 is constituted such that the end of the sleeve 491 comes to abut on the shoulder 492 before the free end of the inclined surface 467 abuts on the surface of the optical element 419.

What is claimed is:

1. A device for beam guiding a laser beam, comprising:
   a housing,
   having a supporting section,
   at least one optical element which is positioned by a retaining element to the supporting section,
   a clamping element that fixes the optical element to the supporting section,
   the supporting section of the housing having a fastening section, on which the clamping element engages for central force introduction of a retaining force and
   at least one retaining element is interpositioned between the clamping element and the optical element that positions the optical element with respect to the supporting section and the supporting section is provided with a full-surface seating of an edge section of the optical element.

2. The device according to claim 1, comprising the clamping element comprises a screw ring.

3. The device according to claim 1, comprising a clamping surface provided between the clamping element and the retaining element, and having at least one sectionally annular surface.

4. The device according to claim 1, wherein the retaining element comprises a stop surface as a mounting safeguard.

5. The device according to claim 1, wherein the supporting section is processed by mining or milling with diamond, polycrystalline diamond (PKD), ceramics, and also by grinding, precision turning, or lapping.

6. The device according to claim 1, wherein the supporting section has a surface roughness of less than 10 μm.

7. The device according to claim 1, comprising a seal provided between the optical element and the retaining element.

8. The device according to claim 1, wherein the optical element consists of diamond, zinc selenide, gallium arsenide, silicon, or copper.

9. The device according to claim 1, wherein the housing section has an exit opening for receiving an optical element whose shape differs from a disk-like or cylinder-like shape, comprising a frame that at least partially surrounds the optical element and positions the optical element in a position coincident with the exit opening in the housing section.

10. The device according to claim 9, wherein the frame has a recess and the retaining element is inserted in the recess of the frame and fixes the optical element and the frame to the supporting section.

11. The device according to claim 9, comprising a respective seal provided between the housing section and the frame and between the optical element and the retaining element.

12. The device according to claim 9, wherein the optical element has an outer contour adapted to a beam profile.

13. The device according to claim 12, wherein the outer contour of the optical element is comprises a rectangular or banana shape.

14. The device according to claim 12, wherein the optical element is an optical element produced from diamond.

15. The device according to claim 7, wherein the retaining element comprises a surrounding inclined surface abutting on the seal and fixing the seal in the axial direction to the optical element.

16. The device according to claim 15, wherein the inclined surface comprises a round external contour.

17. The device according to claim 15, comprising a seal between the retaining element and the optical element, and comprises an O-ring.

18. The device according to claim 15, comprising a bore section surrounding the optical element wherein the seal is at least equal or larger in external diameter than the bore section.

* * * * *